United States Patent [19]

Roger

[11] 3,847,056

[45] Nov. 12, 1974

[54] APPARATUS FOR MANUFACTURING INTERNAL GEARS

[75] Inventor: Yves Roger, Meudon-la-Foret, France

[73] Assignees: Regie Nationale des Usines Renault, Boulogne-Billancourt; Automobiles Peugeot, Paris, both of, France

[22] Filed: May 7, 1973

[21] Appl. No.: 357,597

[30] Foreign Application Priority Data
May 23, 1972 France .............................. 72.18346

[52] U.S. Cl.............................. 90/73, 90/64, 90/86, 90/10
[51] Int. Cl............................................ B23d 37/10
[58] Field of Search .............. 90/86, 63, 73, 79, 80, 90/87, 10

[56] References Cited
UNITED STATES PATENTS
1,318,485   10/1919   Donaldson .......................... 90/80 X
1,627,755   5/1927   Urschel .............................. 90/63 X

*Primary Examiner*—Gil Weidenfeld
*Attorney, Agent, or Firm*—Strauch, Nolan, Neale, Nies & Kurz

[57] ABSTRACT

Apparatus and method for manufacturing internally toothed articles such as gears from hollow cylindrical blanks comprises a die having a cylindrical bore surrounding an externally toothed extrusion broach, the broach having a cylindrical centering extension at the entry side of the die and a supporting extension on the exit side of the die, a tubular ram arranged to periodically enter the die bore around the centering extension to force a series of blanks through the die bore and over the broach in succession, and a retractable support engaging the free end of the broach supporting extension while the ram acts on the blanks and being periodically retracted for discharge of a formed artice.

10 Claims, 2 Drawing Figures

PATENTED NOV 12 1974　　　　　　　　　　　　3,847,056

APPARATUS FOR MANUFACTURING INTERNAL GEARS

This invention relates to the manufacture of articles with internal teeth, such as gears, by extrusion.

One customary method of making internally-toothed gears consists in milling with a Fellows gear-shaper and a more general method involves the use of a broach.

More sophisticated methods are, however, known for manufacturing gears with external teeth, for instance by using cold extrusion techniques such as those described in French Pat. No. 70 42073 and No. 71 39420. By comparison with milling methods, these techniques offer numerous advantages such as speed of operation, simplicity of tooling, precision of the resulting products, and good quality of surface-finish. But such methods of serial production wherein each advancing workpiece forwardly displaces the preceding workpiece cannot be used for the manufacture of gears with internal teeth, because the broaching tool forming the teeth inevitably has to pass through the workpiece, which is thus so to speak impaled on the tool with no possibility of quick release.

The present invention provides and has for a main object apparatus for manufacturing internally toothed articles from hollow cylindrical blanks, comprising a die having a cylindrical bore; an externally toothed extrusion broach within the bore, the broach having a cylindrical centering extension at the entry side of the die and a supporting extension on the exit side of the die; a tubular ram arranged to enter the die around the centering extension of the broach to force a series of blanks through the die; and a retractable support arranged to engage the free end of the supporting extension of the broach as the ram acts on the series of blanks.

The invention also provides and has for another main object a method for manufacturing an internal gear, comprising extruding a hollow cylindrical blank constituting the workpiece by means of a ram into a cylindrical die the diametral aperture of which corresponds to the external diameter of said workpiece while the bore of said workpiece engages with the cylindrical centering shank of a shaping broach having external teeth corresponding to the internal teeth to be formed by extrusion, said broach being thus centered by the workpiece and a supporting extension on the lower end thereof bearing against a support member which is cyclically retractable in synchronization with the withdrawal of the ram feed member, in order to enable the workpiece extruded from the broach to be discharged to an outlet. The support member is thereupon returned to its initial position in contact with the supporting extension of the broach, in order to withstand the next forward movement of the ram on the series of workpieces to be processed, terminating in the feeding of a fresh blank into the die mouth.

Figure 1:
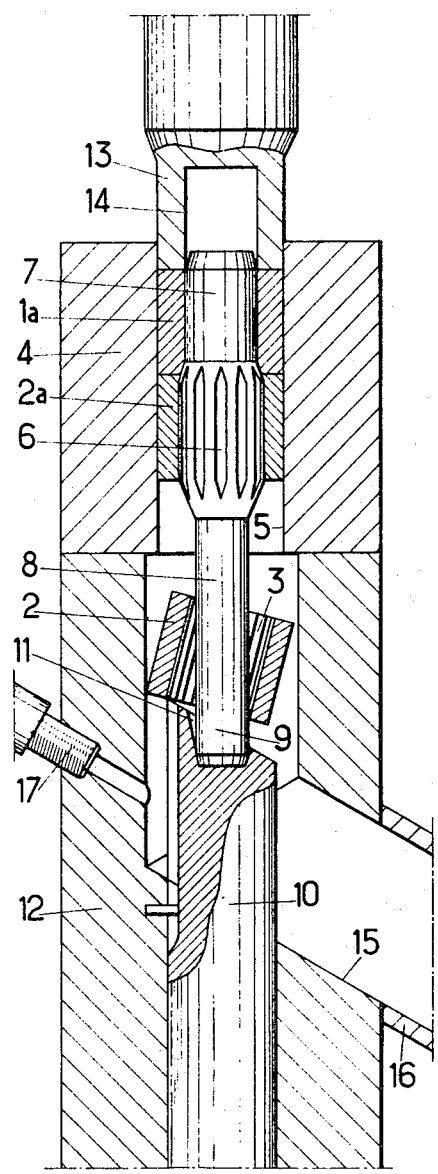
FIG. 1 is a vertical section of internal gear manufacturing apparatus showing the workpieces in three serial stages during extrusion.

The process uses annular blanks 1 in the form of hollow cylinders having a radial wall thickness greater than that of the finished articles 2 which are to be manufactured with internal teeth 3. These blanks 1 are fed either manually or automatically into a die 4 comprising a stationary cylindrical body having hoop reinforcement. The internal diameter 5 of die 4 is substantially equal to the external diameter of the blank 1 and that of the finished article 2. A mandrel having a fluted or grooved portion 6 which acts as an extrusion broach is located in the die 4 and this broach portion corresponds in cross-section to the internal teeth 3 to be formed in the blank.

The mandrel extends rigidly from the extrusion broach 6 on the entry side of the die 4 as a cylindrical centering shank 7 whose external diameter corresponds substantially to the internal diameter of the blank 1, this latter diameter being smaller than the desired final internal diameter of the article 2 and smaller than the diameter measured across the roots of the flutings or grooves of broach 6.

On the opposite side the mandrel extends rigidly from the extrusion broach 6 in tee form of a supporting extension 8 whose extremity 9 normally bears against a retractable support 10, formed for example by the shank of a jack. The upper end of the support 10 has a centering recess 11 which is shaped such that it comes into engagement with the extremity 9 when the support 10 is at the uppermost end of its stroke (FIG. 1) and the broach 6 is in its normal illustrated position. This support 10 is slidably mounted in a bore in a fixed base 12 which serves to support the die 4.

Figure 2:
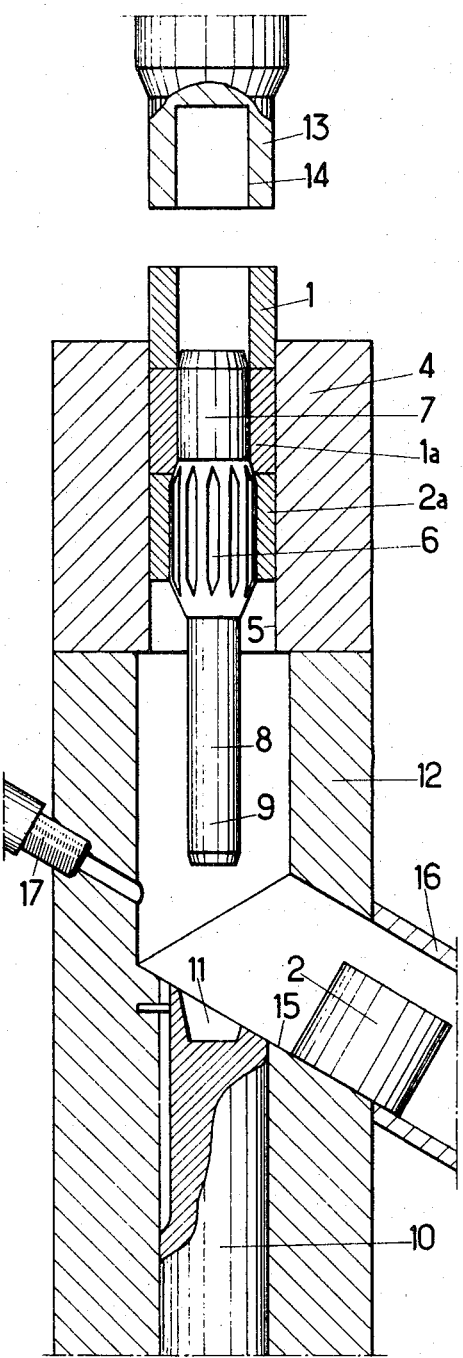
FIG. 2 is a similar section during the following stage of feeding-in a fresh blank and discharging a finished workpiece.

Support 10 is slidably displaceable between a mandrel engaging broach supporting position such as shown in FIG. 1 and a finished article ejection position shown in FIG. 2. Any suitable jack or like mechanism (not shown) that will shift support 10 between those positions and hold it there during an operation of the apparatus may be provided. A tubular ram 13 reciprocably actuated by suitable hydraulic means (not shown) is located above the die 4, its end being so positioned and of such external diameter as to be a sliding fit in the bore 5 of the die. The central cylindrical cavity 14 of the ram 13 is dimensioned so as to fit closely over centering shank 7 of the mandrel. The ram 13 is shown in FIG. 1 in its lowermost position, whereas in FIG. 2 it is shown in its retracted position. The stroke of ram 13 is equal to the axial length of a blank 1.

In starting, while holding support 10 in its upper broach supporting position of FIG. 1, two blanks in succession are advanced across the top of the die to drop into bore 5 in the positions 1a and 1 of FIG. 2. Then the ram 13 is operated to descend whereby the two blanks in the bore will be forced to the condition shown in FIG. 1 wherein the lower blank 2a is impaled on broach 6 and the upper blank assumes the 1a position surrounding the centering shank. At this point the controls are such that the support 10 will be lowered each time the ram is retracted. The ram is retracted and a third blank 1 fed into the upper end of bore 5 as shown in FIG. 2. Now the ram is operated to descend whereby formed blank 2a leaves the broach and slidably descends extension 8 as shown at 2 in FIG. 1, and the upper two blanks assume the 1a and 2a positions.

Now each time that the ram 13 descends it advances the series of blanks in the die by the length of one blank, a finished article 2 is expelled from the lower part of the die 4 and from the broach 6, falls freely along the supporting extension 8, and comes to rest on the end of the retractable support 10. The succeeding workpiece, shown at 2a in FIG. 1, which has not yet been completely extruded, ensures that the broach is adequately centered and held in longitudinal position by friction between the blanks and bore 5 (FIG. 2). Expansion of the blank as it is impaled on the broach enhances this friction.

The ram 13 is lifted and the retractable support 10 is lowered at the same time. The finished article 2 thus freed falls below the extremity 9 of the extension 8 and is discharged along an inclined plane surface 15 formed in the base 12 and extended in the form of a discharge spout 16. The upper end of the support 10 surrounding the centering recess 11 is machined at an angle so as to be flush with the inclined surface 15 when retracted as shown in FIG. 2. Compressed air from a supply 17 may be injected if desired, in order to speed up the discharge of the article 2.

At the same time as the finished extruded article 2 is automatically discharged, a new blank 1 is inserted into the mouth of the die 4 around the upper extremity of the shank 7 of the broach 6, which after the retractable support 10 is raised again, enables the series of blanks to be advanced once more by the length of one blank and so on. The dimensions of the parts are such that preferably the mandrel will be so located that its upper end is sufficiently below the top surface of die 4 to provide a locating recess centered with extension 7.

During each downward stroke of the ram 13, the blank 1a situated below the blank 1 and which is about to be extruded is radially imprisoned between the bore 5 and the cylindrical shank 7 and also longitudinally imprisoned between the blank 2a and the succeeding blank 1 as shown in FIG. 2. It is this relationship which determines the length of the centering shank 7, which thus serves as a guide-spigot.

Owing to the cold extrusion operation, the quality of the teeth 3 produced in the articles 2 is definitely superior to those obtained by milling, and is due to the uniform manner in which the metal flows in each tooth. On the other hand, the apparatus is very simple and the discharge of the finished pieces is automatic, the time required for such discharge not being in addition to the time cycle but on the contrary being completed during the feed time for the new blanks, no matter whether the feeding of the blanks is manual or automatic. In fact complete automation of the process may readily be envisaged owing to the simplicity of the operations and to the linear and continuous progression of the workpiece at each cycle. Also more than three blanks can be serially arranged in a bore 5, the lowermost being in position 1a of FIG. 2 and the uppermost being in position 1 of FIG. 2.

The method is applicable both for the manufacture of rings with internal teeth to be used as gears and for the manufacture of collars intended to be mounted on grooved or splined spindles so as to be slidable in the keyway or splines thus formed. The method is applicable to all metals which are susceptible to extrusion. Thus for example synchronizing hubs for gear boxes may be manufactured, such hubs having six internal grooves, the final interior diameter of the hubs being 25.7 mm and the diameter of the rods of the grooves being 30.3 mm starting with a sleeve of internal diameter 23.8 mm, of XC steel (Afnor standard), using an applied force of the order of 50 tons with a reduction of cross-sectional area of about 14 percent.

Although the example given is concerned with gears with straight teeth, the process according to the invention likewise enables helical gears to be made by extrusion. In this case the broach 6, which is freely rotatably mounted, turns about its axis as permitted by the cylindrical support recess 11 during extrusion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for manufacturing internally toothed articles from similar hollow cylindrical blanks comprising a die having a cylindrical bore for receiving a series of such blanks in end to end relation, an externally toothed extrusion broach within the bore, said broach having a blank centering extension at the entry side of the die and a supporting extension at the exit side of the die, ram means constructed and arranged to act on said blanks to periodically force said blanks in succession through the die where there are formed with internal teeth in passing over said broach, and a retractable support mounted to be displaced between a position where it engages the free end of said supporting extension of the broach while the ram means acts to move said blanks and a retracted position permitting a finished toothed article to pass from said supporting extension.

2. Apparatus as claimed in claim 1, in which the die is mounted on a hollow base having a sloping discharge passage surface for finished articles, said retractable support having a sloping end which becomes flush with the said discharge passage surface when the support is retracted.

3. Apparatus as claimed in claim 2, comprising means for introducing compressed air to displace the finished article along said discharge passage surface.

4. Apparatus as defined in claim 1, wherein said die bore is of such diameter as to slidably receive and contain said series of blanks and said blank centering extension is of a diameter to slidably receive a blank.

5. Apparatus as defined in claim 4, wherein the internal teeth of said broach have longitudinal grooves between them and the internal diameter of the broach measured across said grooves is smaller than the internal diameter of the blank being forced thereover.

6. Apparatus as defined in claim 1, wherein the stroke of said ram means is substantially equal to the length of a blank.

7. Apparatus as defined in claim 6, wherein the axial length of said broach is substantially equal to the axial length of a blank whereby a toothed article is completed during each stroke of said ram means.

8. The apparatus defined in claim 1, wherein said retractable support is formed with an end recess axially seating the adjacent end of said broach supporting extension.

9. The apparatus defined in claim 1, wherein said ram means is formed with a hollow portion adapted to enter said die bore around said centering extension during the forming stroke.

10. The apparatus defined in claim 1, wherein said ram means is periodically retracted to introduce a fresh blank into said die bore and wherein said support is retracted from engagement with the end of said supporting extension of said broach to permit a formed article to pass over and from said supporting extension when said ram means is retracted, said broach being longitudinally frictionally sustained in said bore while said support is retracted.

* * * * *